March 5, 1963     S. SAPERSTEIN     3,079,835

ALIGNMENT THEODOLITE

Filed Jan. 14, 1959

INVENTOR.
S. SAPERSTEIN

BY *E. P. Hyde Jr.*

ATTORNEY

3,079,835
ALIGNMENT THEODOLITE
Sol Saperstein, Norwalk, Conn., assignor to The Perkin-Elmer Corporation, Norwalk, Conn., a corporation of New York
Filed Jan. 14, 1959, Ser. No. 786,889
6 Claims. (Cl. 88—14)

The present invention relates to a device for measuring small angles in a plane. More particularly, the invention concerns an azimuth alignment theodolite of the type wherein a beam of light is transmitted to a distant object and reflected back to a monitoring system. The reflected light beam will indicate the direction of deviation of the object from a predetermined normal position.

The invention to be described has wide utility and may be used for checking the spatial position of any large object. The system has found particular use in monitoring missile guidance platforms prior to launching and will, therefore, be described in connection therewith. In such installations it is necessary to determine the exact position of the missile with respect to its rotational position about the vertical axis. This determination is then used to control a servo system which in turn controls the missile platform. Accordingly, the theodolite of the present invention is located a distance from the missile and in a fixed position. A light beam is transmitted to a small reflecting device secured to the missile platform and the reflected beam will indicate the angular position of the platform. In theodolites of this general type two modulated light beams are provided which are 180° out of phase with each other. These two beams are reflected from the object and returned to the theodolite so that either beam can pass through an entrance slit to a light sensitive detector. When the monitored device is deviated from the normal position either the in phase or out of phase light beam will enter the slit to produce a correction signal, the phase of which indicates the direction of deviation of the missile from the predetermined normal position. When the monitored object or missile is perpendicular to the optical axis of the beams, a minimum of light from either beam enters the slit allowing a null condition to exist, and no correction signal will be produced.

In this type of system, the mechanism controlling the position of the object is controlled by the correction signal and hence depends upon the detection of the null condition. Thus, the situation when no reflected beams are returned to the detector could be mistaken for a null. If, for example, the missile were substantiallly out of position neither beam would be reflected to the monitoring system and it would appear that a null condition, indicating proper alignment, exists. It is to this general problem that the present invention is directed.

Accordingly, an object of the present invention is to provide an improved azimuth alignment theodolite.

Another object of the present invention is to provide an improved azimuth alignment theodolite of the type wherein a pair of modulated light beams are projected to a monitored object and reflected to a detector that indicates the position of the object.

A further object of the present invention is to provide an angle measuring device of the type wherein light beams reflected from a monitored object are detected, and wherein the light sources are modulated with a fundamental frequency 180° out of phase and a superimposed secondary frequency in phase coincidence.

A further object of the present invention is to provide a system of the character described wherein a second modulating signal is applied to each light source and wherein said second signals are in phase.

In accordance with the above and other objects, the present invention provides a pair of glow discharge lamps, each of which is imaged on respective sides of truncated prism which reflects the two beams through a telescopic system to the object being monitored. The latter is equipped with a reflecting device such as a roof prism, which when properly positioned, will return each light beam to the opposite side of the truncated prism from which it originated. If the reflecting roof prism deviates from its normal position, one of the light beams will be reflected to the truncated surface of the prism serving as an entrance slit, and then to a photosensitive device such as a photomultiplier tube. The amount of light received by the slit will be a function of the angular deviation of the object and the direction of deviation will be indicated by the particular beam passing through the slit. In order to distinguish between the two beams, they are modulated 180° out of phase at a predetermined frequency such as 400 cycles per second. The output of the photomultiplier will connect to an amplifier and demodulator to provide a polarized error signal which is used to control the servo mechanism of the missile platform.

With the monitored object correctly positioned perpendicular to the optical axis of the system a null condition will exist. In this condition a small amount of light still passes through the slit as a result of imperfect images caused by normal optical aberrations. However, this will be cancelled since the two beams are 180° out of phase and thus the net signal detected by the photomultiplier will be zero. If the monitored missile is well out of position, neither beam will be reflected to the slit and a false null condition can exist. To distinguish between a true and false null, both light sources are modulated with a second frequency which may be, for example, 800 cycles per second and in phase coincidence. Thus during a true null condition, the 800 cycle signal will be detected, but during a false null it will be absent. The absence of this second modulating signal is detected in the output of the photomultiplier indicating that the beams are not being reflected back to the theodolite. The absence of this second modulating signal can thus be utilized to cause the servo to hunt for the proper missile position.

The invention will be more fully understood from the following description of a specific embodiment thereof taken with the drawings in which.

Figure 1:
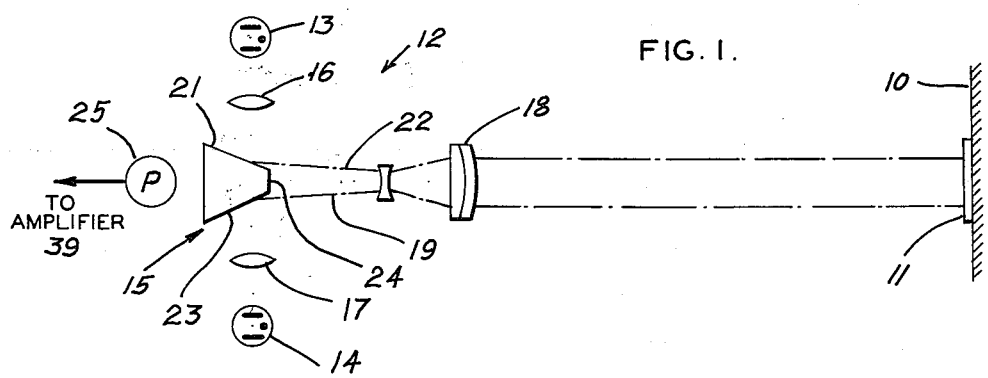
FIG. 1 is a schematic plan view of the optical monitoring system.
Figure 3:
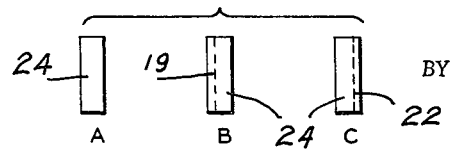
FIG. 3 shows a front view of the slit and the entering light beams for different positions of the monitored object.

Referring now to the drawings and more particularly to FIG. 1, numeral 10 indicates an object such as a missile whose position is to be monitored. The missile is equipped with a suitable reflecting device such as a mirror or roof prism, 11, secured in a predetermined position. The optical arrangement of the theodolite is generally indicated by numeral 12 and includes a pair of light sources 13 and 14 which may take the form of gas discharge lamps modulated 180° out of phase at a frequency of 400 cycles per second. Each light source is imaged on opposite sides of a truncated prism 15 by means of lenses 16 and 17. The outer sides 21 and 23 of the prism 15 are aluminized to provide reflecting surfaces and the prism vertex is located in the focal plane of an objective lens 18. Thus at the focal plane there are two modulated light sources and a slit all symmetrically placed about the optic axis. The result is that a special collimated beam in space is formed which consists of a central slit portion and two sections 19 and 22 of modulated light. The beams are directed to the reflecting device 11 and reflected back to the detecting system. When the reflector 11 is perpendicular to the optical axis, the beams 19 and 22 will form images of the sources at the focal plane of objective 18 opposite to their places of origin. Beam 19 of the image source 14 will be reflected back and appear on surface 21 of the prism. Similarly, beam 22 of the imaged source 13 will appear on prism surface 23. During this null condition only minor portions of the two beams, due to image imperfection, will enter the entrance slit 24 and these will cancel since beams 19 and 22 are 180° out of phase. FIG. 3A indicates substantially zero energy entering the slit 24 during this null condition.

If the mirror 11 is deviated in one direction from its normal position, a portion of beam 19 will pass through the slit as shown in FIG. 3B. Similarly, with the mirror turned in the opposite direction, a portion of beam 22 will pass through slit 24 as seen in FIG. 3C. These beams will be detected by the photomultiplier 25 which is connected to a demodulator circuit to detect the direction of deviation of the mirror.

Figure 2:
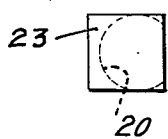
FIG. 2 is a side view of the truncated prism showing the position of the imaged light source.

One feature of the present invention that improves the sensitivity of the system is illustrated in FIG. 2. It is seen that the image 20 which is generally circular is offset a small amount so that any deviation of the monitored object will result in a substantially rectangular ray of light entering the slit rather than a small sector as would occur were the circular image tangent to the front surface of the prism.

Figure 4:
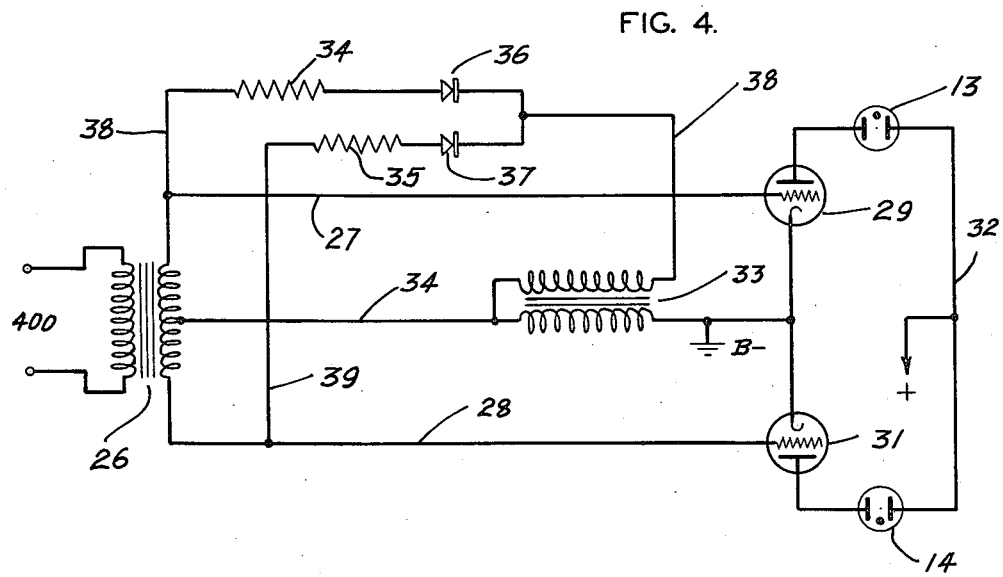
FIG. 4 is a schematic wiring diagram showing the two modulating signals applied to the light sources.

Referring now to FIG. 4, there is shown the energizing circuit for the gas discharge lamps 13 and 14. A 400 cycle source is connected to the primary of transformer 26, the secondary of which is connected by wires 27 and 28 to the control grids of tubes 29 and 31 respectively. The cathodes of the tubes are connected together and to ground which is at negative potential. The anode of each tube 29 and 31 connects to the cathodes of lamps 13 and 14 respectively and a constant D.C. bias of positive potential is applied to the lamps by wire 32. Thus it is seen that the intensity of the lamps will vary at a 400 cycle frequency.

Transformer 26 is center tapped and connects to the ends of the primary and secondary windings of transformer 33 by wire 34. The 400 cycle signal appearing at the secondary of transformer 26 is passed through resistors 34, 35 and diodes 36, 37 by wires 38 and 39. In this manner the full wave rectified output at the diodes constituting an 800 cycle signal is connected to the primary of transformer 33 by wire 38. This 800 cycle signal appearing at the secondary of transformer 33 is superimposed over the 400 cycle signal so that the lamps are modulated at both frequencies.

Figure 5:
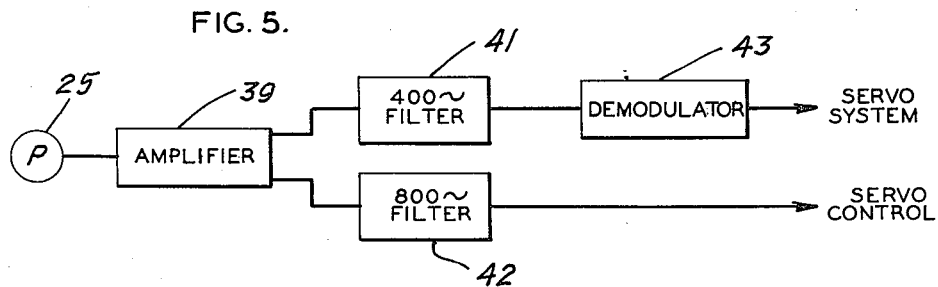
FIG. 5 is a block diagram indicating the arrangement of the detecting and servo control system.

As shown in FIG. 5, the output of the photomultiplier is connected to an amplifier 39 and then to a 400 cycle filtering network 41 and an 800 cycle filtering network 42. The 400 cycle signal which indicates the deviation of the mirror from its normal position is then passed to a demodulator 43, the output of which controls the missile platform servo system. The details of the demodulator form no part of the present invention and it is therefore, shown in block form. It is understood, of course, that its output is polarized so that the servo system will operate in the proper direction to correct for the deviation of the missile from the normal position.

During a true null condition a small amount of light from each beam 19 and 22 will enter the slit due to optical aberrations of the images. The 400 cycle components of this light will cancel since they are out of phase. However, the 800 cycle components, being in phase are additive and will be detected by the photomultiplier, amplified and passed through the filter 42 to a servo control. With a true null condition existing, the servo would be maintained inactive to keep the monitored object properly positioned. Were the object 10 substantially out of position the 800 cycle component would be absent as well as the 400 cycle frequency. In this event the servo control would operate to appropriately control the servo system.

Although the present invention has been described with respect to a specific embodiment thereof, it is understood that this is not to be considered as limiting the scope of the invention as set forth in the appended claims.

I claim:

1. A system of the character described to determine the angular deviation of a distant object from a normal position comprising means providing a pair of separate radiant energy beams, means to modulate said beams in phase opposition at a first frequency, means to modulate said beams in phase coincidence at a second frequency, means to direct said modulated beams to a distant reflective object, entrance slit means adapted to receive portions of said beams reflected from the distant object, radiant energy sensitive means positioned to receive the portions of said beams passing through said slit means whereby a signal is produced having a first frequency component in accordance with said first modulation frequency and a second frequency component in accordance with said second modulation frequency.

2. A system of the character described to determine the angular deviation of a distant object from a normal position comprising means providing a pair of separate radiant energy beams, means to modulate said beams in phase opposition at a first frequency, means to modulate said beams in phase coincidence at a second frequency, means to direct said modulated beams to a distant reflective object, entrance slit means adapted to receive portions of said beams reflected from the distant object, radiant energy sensitive means positioned to receive the portions of said beams passing through said slit means whereby a signal is produced having a first frequency component in accordance with said first modulation frequency and a second frequency component in accordance with said second modulation frequency, filter means connected to said radiant energy sensitive means to separate said first and second signal components to provide first and second control signals in accordance with the position of the distant object.

3. A system of the character described to determine the angular deviation of a distant object from a normal position comprising means providing a pair of separate light beams, means to modulate said light beams in phase opposition at a first frequency, means to modulate said light beams in phase coincidence at a second frequency, means to direct said modulated light beams from said sources to a distant reflective object, entrance slit means adapted to receive portions of said beams reflected from the distant object, photosensitive means positioned to receive the portions of light beams passing through said slit means whereby a signal is produced having a first frequency component in accordance with said first modulation frequency and a second frequency component in accordance with said second modulation frequency, filter means connected to said photosensitive means to separate said first and second signal components to provide first and second control signals in accordance with the position of the distant object.

4. A system of the character described to determine the angular deviation of a distant object from a normal position comprising means providing a pair of light sources, means to modulate said light sources in phase opposition at a first frequency, means to modulate said light sources in phase coincidence at a second frequency, means to direct said modulated light beams from said sources to a distant reflective object, entrance slit means adapted to receive portions of said beams reflected from the distant object, photosensitive means positioned to receive the portions of light beams passing through said slit means whereby a signal is produced having a first frequency component in accordance with said first modulation frequency and a second frequency component in accordance with said second modulation frequency, filter means connected to said photosensitive means to separate said first and second signal components to provide first and second control signals in accordance with the position of the distant object.

5. A system of the character described to determine the angular deviation of a distant object from a normal position comprising means providing a pair of light sources, means to modulate said light sources in phase opposition at a first frequency, means to modulate said light sources in phase coincidence at a second frequency, means including a truncated prism to direct said modulated light beams from said sources to a distant reflective object, the truncated surface of said prism providing an entrance slit from the distant object, photosensitive means positioned to receive the portions of light beams passing through said entrance slit means whereby a signal is produced having a first frequency component in accordance with said first modulation frequency and a second frequency component in accordance with said second modulation frequency, filter means connected to said photosensitive means to separate said first and second signal components to provide first and second control signals in accordance with the position of the distant object.

6. A system of the character described to determine the angular deviation of a distant object from a normal position comprising means providing a pair of light sources, means to modulate said light sources in phase opposition at a first frequency, means to modulate said light sources in phase coincidence at a second frequency, a truncated prism, means to image said sources on opposite sides of said prism, lens means, the truncated surface of the prism being located in the focal plane of said lens means, whereby light beams are directed to a distant reflective object, the truncated surface of said prism providing an entrance slit to receive portions of said beams reflected from the distant object, photosensitive means positioned to receive the portions of light beams passing through said entrance slit means whereby a signal is produced having a first frequency component in accordance with said first modulation frequency and a second frequency component in accordance with said second modulation frequency, filter means connected to said photosensitive means to separate said first and second signal components to provide first and second control signals in accordance with the position of the distant object.

References Cited in the file of this patent

UNITED STATES PATENTS

| | | |
|---|---|---|
| 2,369,622 | Toulon | Feb. 13, 1945 |
| 2,483,102 | Pierson | Sept. 27, 1949 |
| 2,722,156 | Warren | Nov. 1, 1955 |
| 2,905,828 | O'Maley et al. | Sept. 22, 1959 |

FOREIGN PATENTS

| | | |
|---|---|---|
| 519,417 | Great Britain | Mar. 27, 1940 |